US010628569B2

(12) United States Patent
Li

(10) Patent No.: US 10,628,569 B2
(45) Date of Patent: Apr. 21, 2020

(54) METHOD FOR UNLOCKING SCREEN BY USING FINGERPRINT AND TERMINAL

(71) Applicant: Huawei Technologies Co., Ltd., Shenzhen (CN)

(72) Inventor: Danhong Li, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 42 days.

(21) Appl. No.: 15/511,280

(22) PCT Filed: Jun. 30, 2015

(86) PCT No.: PCT/CN2015/082890
§ 371 (c)(1),
(2) Date: Mar. 15, 2017

(87) PCT Pub. No.: WO2017/000251
PCT Pub. Date: Jan. 5, 2017

(65) Prior Publication Data
US 2017/0286660 A1    Oct. 5, 2017

(51) Int. Cl.
*H04L 9/00* (2006.01)
*G06F 21/32* (2013.01)
*G06K 9/00* (2006.01)

(52) U.S. Cl.
CPC ......... *G06F 21/32* (2013.01); *G06K 9/00013* (2013.01); *G06K 9/00912* (2013.01)

(58) Field of Classification Search
CPC .................................................... G06F 21/32
USPC ............................................................ 726/19
See application file for complete search history.

(56) References Cited

U.S. PATENT DOCUMENTS

| 2003/0115490 A1* | 6/2003 | Russo ............... G06K 9/00026 726/5 |
| 2009/0083847 A1 | 3/2009 | Fadell et al. |
| 2013/0120325 A1* | 5/2013 | Chen .................. G09G 3/3688 345/204 |

(Continued)

FOREIGN PATENT DOCUMENTS

| CN | 102681777 A | 9/2012 |
| CN | 103544422 A | 1/2014 |

(Continued)

OTHER PUBLICATIONS

Machine Translation and Abstract of Chinese Publication No. CN103618820, Mar. 5, 2014, 5 pages.

(Continued)

*Primary Examiner* — Christopher J Brown
(74) *Attorney, Agent, or Firm* — Conley Rose, P.C.

(57) ABSTRACT

A method for unlocking a screen by using a fingerprint includes: sending, by a fingerprint sensor, a first notification to a control chip and concurrently sending a second notification to a display driver chip of a screen when detecting that a finger presses or touches a fingerprint recognition area; completing, by the display driver chip according to the second notification, preparation work before the screen is turned on; verifying, by the control chip according to the first notification, fingerprint information collected by the fingerprint sensor and pre-stored fingerprint information; and if the verification succeeds, unlocking the screen and turning on the screen.

21 Claims, 3 Drawing Sheets

(56) References Cited

U.S. PATENT DOCUMENTS

| | | | |
|---|---|---|---|
| 2015/0146945 A1* | 5/2015 | Han et al. | G06K 9/00033 382/125 |
| 2015/0253894 A1* | 9/2015 | McKenzie | G06F 3/044 345/174 |
| 2015/0348002 A1* | 12/2015 | Van Os | G06Q 20/40 705/44 |
| 2016/0335471 A1* | 11/2016 | Alameh | G06K 9/00013 |
| 2017/0048238 A1* | 2/2017 | Saito | G06K 19/0723 |
| 2017/0076079 A1 | 3/2017 | Ran et al. | |

FOREIGN PATENT DOCUMENTS

| | | |
|---|---|---|
| CN | 103618820 A | 3/2014 |
| CN | 104008319 A | 8/2014 |
| CN | 104391635 A | 3/2015 |
| EP | 2226741 A1 | 9/2010 |
| EP | 2851829 A1 | 3/2015 |
| EP | 2854071 A2 | 4/2015 |
| KR | 20140035757 A | 3/2014 |
| KR | 20140049705 A | 4/2014 |

OTHER PUBLICATIONS

Machine Translation and Abstract of Chinese Publication No. CN104391635, Mar. 4, 2015, 8 pages.

Machine Translation and Abstract of Chinese Publication No. CN102681777, Sep. 19, 2012, 14 pages.

Machine Translation and Abstract of Chinese Publication No. CN103544122, Jan. 29, 2014, 5 pages.

Machine Translation and Abstract of Korean Publication No. KR20140035757, Mar. 24, 2014, 14 pages.

Machine Translation and Abstract of Korean Publication No. KR20140049705, Apr. 28, 2014, 18 pages.

Foreign Communication From a Counterpart Application, PCT Application No. PCT/CN2015/082890, English Translation of International Search Report dated Mar. 28, 2016, 3 pages.

Foreign Communication From a Counterpart Application, European Application No. 15896782.8, Extended European Search Report dated Aug. 30, 2017, 9 pages.

* cited by examiner

METHOD FOR UNLOCKING SCREEN BY USING FINGERPRINT AND TERMINAL

CROSS-REFERENCE TO RELATED APPLICATIONS

This application is a national stage of international patent application number PCT/CN2015/082890 filed on Jun. 30, 2015, which is hereby incorporated by reference.

TECHNICAL FIELD

Embodiments of the present disclosure relate to the field of fingerprint recognition, and in particular, to a method for unlocking a screen by using a fingerprint and a terminal.

BACKGROUND

Technologies for recognizing a fingerprint, a palm print, and the like are the most mature and inexpensive biometric feature recognition technologies. Fingerprint recognition technologies have been widely applied. The fingerprint recognition technologies may be applied to a door control system and a system of checking work attendance, and there are more applications of fingerprint recognition in the market. For example, the fingerprint recognition technologies may be applied to a notebook computer, a mobile phone, an automobile, and bank payment. Specifically with continuous development of smartphones, a large quantity of requirements related to the fingerprint recognition is generated. For example, the fingerprint recognition is used to unlock a mobile phone, to protect privacy information, and to ensure transaction security.

Most intelligent terminals have fingerprint recognition modules currently. Generally, to unlock a screen, a user needs to turn on the screen by using a power button or a home button. Then fingerprint verification is performed by using a fingerprint recognition module. If the verification succeeds, the screen in unlocked. However, it takes a relatively long time to unlock the screen in this manner.

SUMMARY

Embodiments of the present disclosure provide a method for unlocking a screen by using a fingerprint, an apparatus for unlocking a screen by using a fingerprint, and a terminal, so as to shorten a time it takes to unlock the screen by using the fingerprint, and improve fingerprint unlock experience of a user.

According to a first aspect, a method for unlocking a screen by using a fingerprint is provided, where the method includes: sending, by a fingerprint sensor, a first notification to a control chip and concurrently sending a second notification to a display driver chip of a screen when detecting that a finger presses or touches a fingerprint recognition area; completing, by the display driver chip according to the second notification, preparation work before the screen is turned on; verifying, by the control chip according to the first notification, fingerprint information collected by the fingerprint sensor and pre-stored fingerprint information; and if the verification succeeds, unlocking the screen and turning on the screen.

With reference to the first aspect, in a first possible implementation manner of the first aspect, the completing, by the display driver chip according to the second notification, preparation work before the screen is turned on includes: completing, by the display driver chip according to the second notification, power-on, resetting, and register initialization before the screen is turned on.

With reference to the first possible implementation manner of the first aspect, in a second possible implementation manner of the first aspect, the method further includes: if the verification fails, skipping unlocking the screen and skipping turning on the screen.

With reference to the second possible implementation manner of the first aspect, in a third possible implementation manner of the first aspect, the method further includes: prompting, by means of vibration, a user that the verification fails.

With reference to any one of the first aspect to the third possible implementation manner of the first aspect, in a fourth possible implementation manner of the first aspect, the control chip is specifically a central processing unit (CPU) of a terminal, and the terminal includes the fingerprint sensor.

According to a second aspect, a terminal is provided, where the terminal includes: a fingerprint sensor, a control chip, and a screen, where the fingerprint sensor sends a first notification to the control chip and concurrently sends a second notification to a display driver chip of the screen when detecting that a finger presses or touches a fingerprint recognition area; the display driver chip completes, according to the second notification, preparation work before the screen is turned on; the control chip verifies, according to the first notification, fingerprint information collected by the fingerprint sensor and pre-stored fingerprint information; and if the verification succeeds, the screen is unlocked and the screen is turned on.

With reference to the second aspect, in a first possible implementation manner of the second aspect, the completing, by the display driver chip according to the second notification, preparation work before the screen is turned on includes: completing, by the display driver chip according to the second notification, power-on, resetting, and register initialization before the screen is turned on.

With reference to the first possible implementation manner of the second aspect, in a second possible implementation manner of the second aspect, if the verification fails, the screen is not unlocked and the screen is not turned on.

With reference to the second possible implementation manner of the second aspect, in a third possible implementation manner of the second aspect, a user is prompted, by means of vibration, that the verification fails.

With reference to any one of the second aspect to the third possible implementation manner of the second aspect, in a fourth possible implementation manner of the second aspect, the control chip is specifically a CPU of the terminal.

According to a third aspect, a method for unlocking a screen by using a fingerprint is provided, where the method includes: sending, by a fingerprint sensor, a first notification to a control chip and concurrently sending a second notification to a display driver chip of a screen when detecting that a finger presses or touches a fingerprint recognition area; turning on, by the display driver chip, the screen according to the second notification; verifying, by the control chip according to the first notification, fingerprint information collected by the fingerprint sensor and pre-stored fingerprint information; and if the verification succeeds, unlocking the screen.

According to a fourth aspect, a terminal is provided, where the terminal includes: a fingerprint sensor, a control chip, and a screen, where the fingerprint sensor sends a first notification to the control chip and concurrently sends a second notification to a display driver chip of the screen when detecting that a finger presses or touches a fingerprint recognition area; the display driver chip turns on the screen according to the second notification; the control chip verifies, according to the first notification, fingerprint information collected by the fingerprint sensor and pre-stored fingerprint information; and if the verification succeeds, the screen is unlocked.

According to a fifth aspect, a computer readable storage medium storing one or more programs is provided, where the one or more programs include instructions, where when the instructions are executed by a portable electronic device including a display and multiple application programs, the portable electronic device performs the method according any one of the first aspect to the fourth possible implementation manner of the first aspect, where the display includes a touch-sensitive surface and a display screen.

According to a sixth aspect, a computer readable storage medium storing one or more programs is provided, where the one or more programs include instructions, where when the instructions are executed by a portable electronic device including a display and multiple application programs, the portable electronic device performs the method according to the third aspect, where the display includes a touch-sensitive surface and a display screen.

In the foregoing technical solutions, by means of a method for unlocking a screen by using a fingerprint in the embodiments of the present disclosure, a fingerprint sensor sends a first notification to a control chip and concurrently sends a second notification to a display driver chip of a screen when detecting that a finger presses or touches a fingerprint recognition area; the display driver chip completes, according to the second notification, preparation work before the screen is turned on; the control chip verifies, according to the first notification, fingerprint information collected by the fingerprint sensor and pre-stored fingerprint information; and if the verification succeeds, the screen is unlocked and the screen is turned on, so that a time it takes to unlock the screen by using a fingerprint can be shortened, and fingerprint unlock experience of a user can be improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

It should be understood that ordinal numbers such as "first" and "second" mentioned in the embodiments of the present disclosure are used only for differentiation unless they actually indicate a sequential order with reference to the context.

A terminal mentioned in the embodiments of the present disclosure includes, but is not limited to, a terminal that may include a fingerprint sensor, such as a smartphone, a notebook computer, a tablet computer, a wearable device, and a door control apparatus.

The following uses a smartphone as an example to describe a method for unlocking a screen by using a fingerprint according to an embodiment of the present disclosure.

Figure 1A:
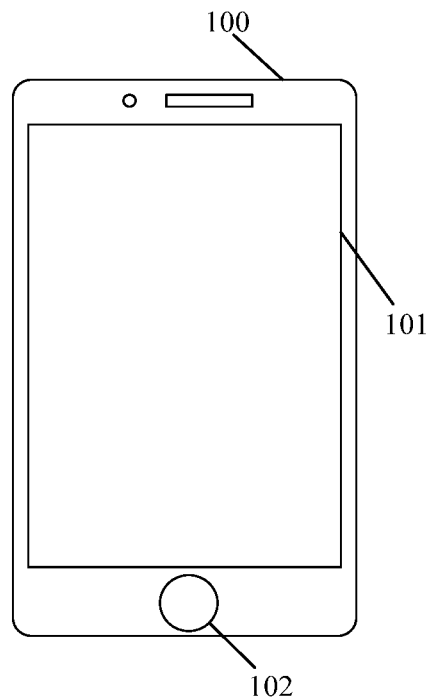
FIG. 1A is a schematic diagram of a location of a fingerprint sensor in a terminal.
Figure 1B:
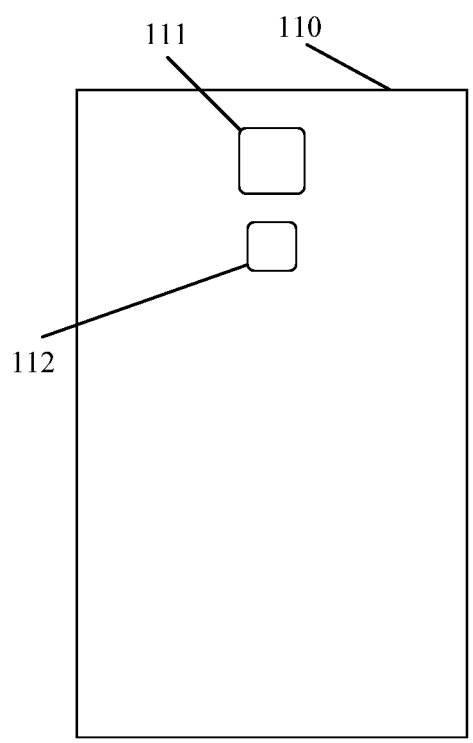
FIG. 1B is another schematic diagram of a location of a fingerprint sensor in a terminal.

With development of fingerprint recognition technologies, a fingerprint recognition module has become a standard configuration of a smartphone, such as the iPhone 6 and iPhone 6 Plus of the Apple company, and the Mate 7 mobile phone of the Huawei company. A user may unlock a mobile phone by using a fingerprint, and may complete shopping online by using the fingerprint. This has a great practical value. Generally, the fingerprint recognition module is also referred to as a fingerprint recognizer, including a fingerprint sensor and a control chip. The fingerprint sensor is configured to collect fingerprint information of the user. The control chip is mainly configured to compare fingerprint information detected by the fingerprint sensor with fingerprint information pre-stored by the user, to complete fingerprint verification. The control chip may be a main control chip of the fingerprint recognizer, or a CPU of a terminal may be directly used as the control chip. A fingerprint sensor 102 may be located below a front screen 101 of a mobile phone 100, as shown in FIG. 1A. A fingerprint sensor 112 may be located below a rear camera 111 of a mobile phone 110, as shown in FIG. 1B. Alternatively, either of the fingerprint sensors may be located at a side of the corresponding mobile phone. Optionally, when the fingerprint sensor is located at the side of the mobile phone, the fingerprint sensor and a power button may be combined into one.

When a user uses a terminal having a fingerprint recognition module, if the user intends to unlock a screen, the user needs to press or touch a fingerprint sensor first. The fingerprint sensor collects fingerprint information of the user, to perform fingerprint verification. If the verification succeeds, the fingerprint sensor instructs a display driver chip of the screen to turn on the screen. The process of unlocking the screen includes two serial processes: fingerprint verification and screen turning on. Therefore, it takes a relatively long time to unlock the screen in this manner.

Embodiment 1

Figure 2:
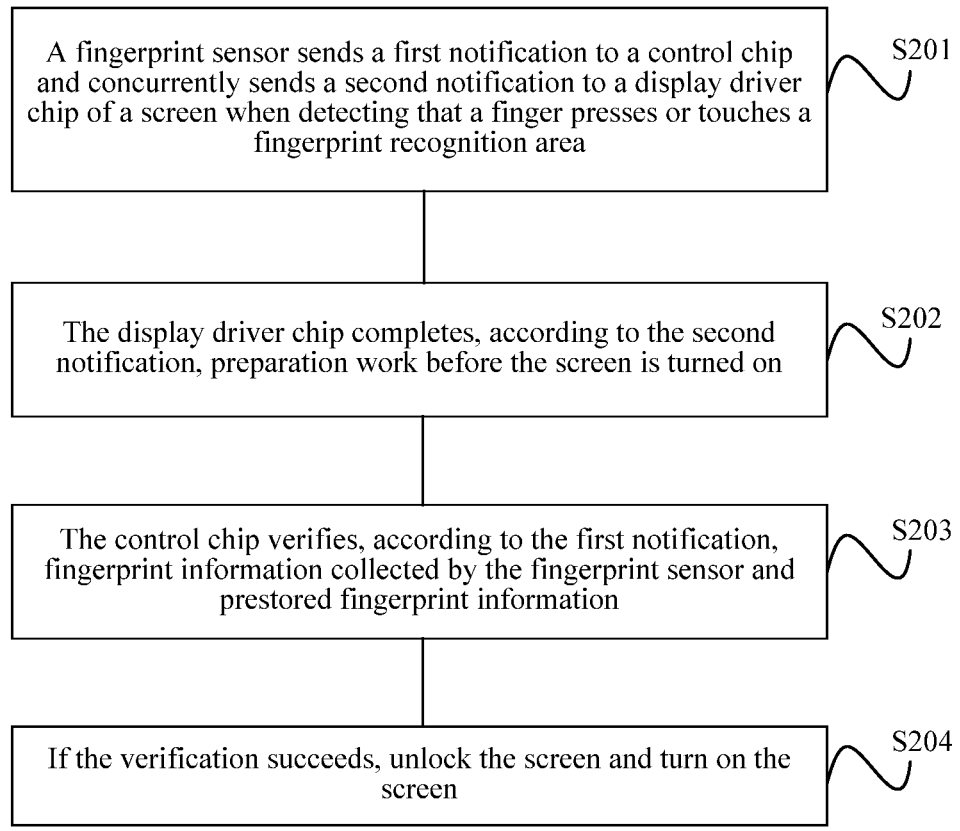
FIG. 2 is a schematic diagram of a method for unlocking a screen by using a fingerprint according to an embodiment of the present disclosure.

FIG. 2 is a schematic diagram of a method for unlocking a screen by using a fingerprint according to this embodiment of the present disclosure, and the method includes the following steps.

S201: A fingerprint sensor sends a first notification to a control chip and concurrently sends a second notification to a display driver chip of a screen when detecting that a finger presses or touches a fingerprint recognition area.

The fingerprint sensor mainly includes an optical fingerprint sensor and a semiconductor fingerprint sensor. The semiconductor fingerprint sensor includes a capacitive fingerprint sensor and an inductive fingerprint sensor. The capacitive fingerprint sensor is a sensor commonly used on an intelligent terminal. The fingerprint sensor on the intelligent terminal mainly includes a pressure-sensitive fingerprint sensor of the iPhone 6 of the Apple company, or a contact fingerprint sensor of the Mate7 of the Huawei company. The fingerprint sensors are both capacitive fingerprint sensors.

Using the capacitive fingerprint sensor as an example, when a user presses or touches a fingerprint recognition area of the fingerprint sensor, a capacitance of the fingerprint sensor changes, and the fingerprint sensor concurrently sends two notifications. The fingerprint sensor sends a first notification to a control chip, and concurrently sends a second notification to a display driver chip of a screen. Using an Android system as an example, the fingerprint sensor may sends the second notification to a lock screen application, and the lock screen application instructs the display driver chip to complete preparation work before the screen is turned on. For the capacitive fingerprint sensor, the first notification may be a notification of a capacitance change, or may be a notification indicating that fingerprint information is collected, and the second notification may be a notification of a capacitance change, or may be a notification indicating that fingerprint information is collected.

The fingerprint sensor concurrently sends two notifications, so as to make the preparation work of the display driver chip before the screen is turned on and a fingerprint verification process be concurrently performed. In this way, a total time it takes to unlock the screen by using a fingerprint can be shortened.

S202: The display driver chip completes, according to the second notification, preparation work before the screen is turned on.

To turn on the screen, the display driver chip needs to complete preparation work such as power-on, and then the display driver chip can adjust screen backlight, and turn on the screen. The display driver chip is mainly configured to control and drive display of the screen.

S203: The control chip verifies, according to the first notification, fingerprint information collected by the fingerprint sensor and pre-stored fingerprint information.

A user may input in advance fingerprint information of the user into a terminal including a fingerprint sensor. When the user unlocks a screen of the terminal, the fingerprint sensor collects fingerprint information of the user, and then the control chip may compare the fingerprint information of the user that is collected by the fingerprint sensor with the fingerprint information pre-stored in the terminal, to perform fingerprint verification.

S204: If the verification succeeds, unlock the screen and turn on the screen.

The screen unlocking and the screen turning on may be considered as two independent processes, and an order of the two is not limited.

The preparation work before the screen is turned on takes approximately 400 milliseconds (ms), and approximately 10 milliamps (mA) power consumption is required. However, it takes 30 ms to turn on the screen backlight, but 200 mA power consumption is required. It can be seen that, by means of concurrently performing the preparation work of the display driver chip before the screen is turned on and the fingerprint verification process, a total time it takes to unlock the screen by using a fingerprint can be shortened.

Optionally, the completing, by the display driver chip according to the second notification, preparation work before the screen is turned on includes: completing, by the display driver chip, preparation work such as power-on, resetting, and register initialization.

Optionally, if the verification fails, the screen is not unlocked and the screen is not turned on. To reduce power consumption, previous preparation work of the display driver chip may be canceled. For example, the preparation work such as power-on, resetting, and register initialization is canceled.

Optionally, to intuitively prompt a user and improve user experience, when fingerprint verification of the user fails, the user is prompted by means of vibration, or the user may be prompted by means of light-emitting diode (LED) light blinking.

Optionally, the control chip is specifically a CPU of a terminal, and the terminal includes the fingerprint sensor. Because CPUs of intelligent terminals become more powerful currently, fingerprint verification may be completed by the CPUs of the terminals. Therefore, currently, most manufactures mainly use CPUs of terminals as chips controlling fingerprint sensors. The control chip is mainly configured to compare fingerprint information detected by the fingerprint sensor with fingerprint information pre-stored by a user, to complete fingerprint verification. The CPU of the terminal may be a single-core CPU or may be a multi-core CPU. The control chip may also be a main control chip of a fingerprint recognition module. The main control chip may be a chip independent of the CPU of the terminal.

This embodiment of the present disclosure provides a method for unlocking a screen by using a fingerprint, where a fingerprint sensor sends a first notification to a control chip and concurrently sends a second notification to a display driver chip of a screen when detecting that a finger presses or touches a fingerprint recognition area; the display driver chip completes, according to the second notification, preparation work before the screen is turned on; the control chip verifies, according to the first notification, fingerprint information collected by the fingerprint sensor and pre-stored fingerprint information; and if the verification succeeds, the screen is unlocked and the screen is turned on, so that a time it takes to unlock the screen by using a fingerprint can be shortened, and fingerprint unlock experience of a user can be improved.

Embodiment 2

Figure 3:
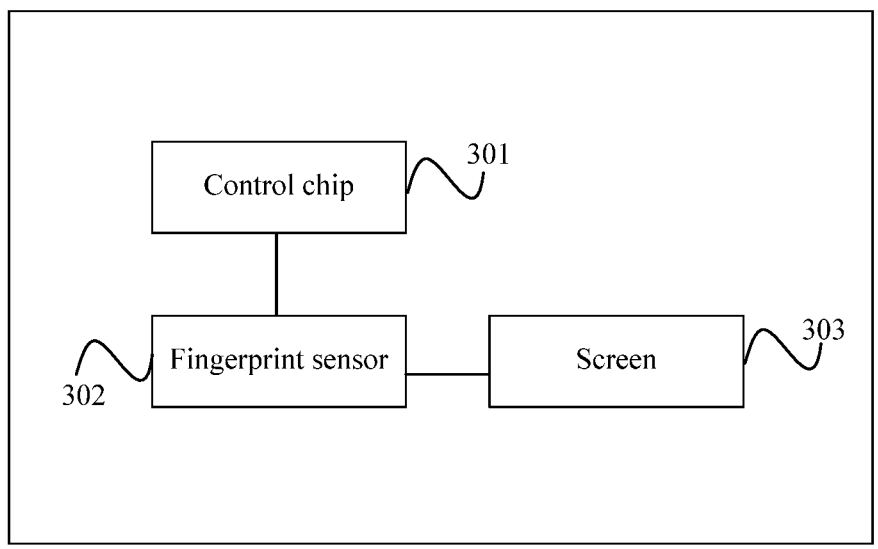
FIG. 3 is a schematic structural diagram of a terminal according to an embodiment of the present disclosure.

FIG. 3 shows a terminal according to this embodiment of the present disclosure. The terminal includes: a fingerprint sensor 302, a control chip 301, and a screen 303. The fingerprint sensor 302 sends a first notification to the control chip 301 and concurrently sends a second notification to a display driver chip of the screen 303 when detecting that a finger presses or touches a fingerprint recognition area. The display driver chip completes, according to the second notification, preparation work before the screen 303 is turned on. The control chip 301 verifies, according to the first notification, fingerprint information collected by the fingerprint sensor 302 and pre-stored fingerprint information. If the verification succeeds, the screen 303 is unlocked and the screen 303 is turned on.

The preparation work before the screen is turned on takes approximately 400 ms, and approximately 10 mA power consumption is required. However, it takes 30 ms to turn on screen backlight, but 200 mA power consumption is required. It can be seen that, by means of concurrently performing the preparation work of the display driver chip before the screen is turned on and the fingerprint verification process, a total time it takes to unlock the screen by using a fingerprint can be shortened.

Optionally, the completing, by the display driver chip according to the second notification, preparation work before the screen is turned on includes: completing, by the display driver chip, preparation work such as power-on, resetting, and register initialization.

Optionally, if the verification fails, the screen is not unlocked and the screen is not turned on. To reduce power consumption, previous preparation work of the display driver chip may be canceled. For example, the preparation work such as power-on, resetting, and register initialization is canceled.

Optionally, to intuitively prompt a user and improve user experience, when fingerprint verification of the user fails, the user is prompted by means of vibration, or the user may be prompted by means of LED light blinking.

Optionally, the control chip is specifically a CPU of a terminal. Because CPUs of intelligent terminals become more powerful currently, fingerprint verification may be completed by the CPUs of the terminals. Therefore, currently, most manufactures mainly use CPUs of terminals as chips controlling fingerprint sensors. The control chip is mainly configured to compare fingerprint information detected by the fingerprint sensor with fingerprint information pre-stored by a user, to complete fingerprint verification. The CPU of the terminal may be a single-core CPU or may be a multi-core CPU. The control chip may also be a main control chip of a fingerprint recognition module. The main control chip may be a chip independent of the CPU of the terminal.

This embodiment of the present disclosure provides a terminal, and the terminal includes: a fingerprint sensor, a control chip, and a screen, where the fingerprint sensor sends a first notification to the control chip and concurrently sends a second notification to a display driver chip of the screen when detecting that a finger presses or touches a fingerprint recognition area; the display driver chip completes, according to the second notification, preparation work before the screen is turned on; the control chip verifies, according to the first notification, fingerprint information collected by the fingerprint sensor and pre-stored fingerprint information; and if the verification succeeds, the screen is unlocked and the screen is turned on, so that a time it takes to unlock the screen by using a fingerprint can be shortened, and fingerprint unlock experience of a user can be improved.

Embodiment 3

Figure 4:
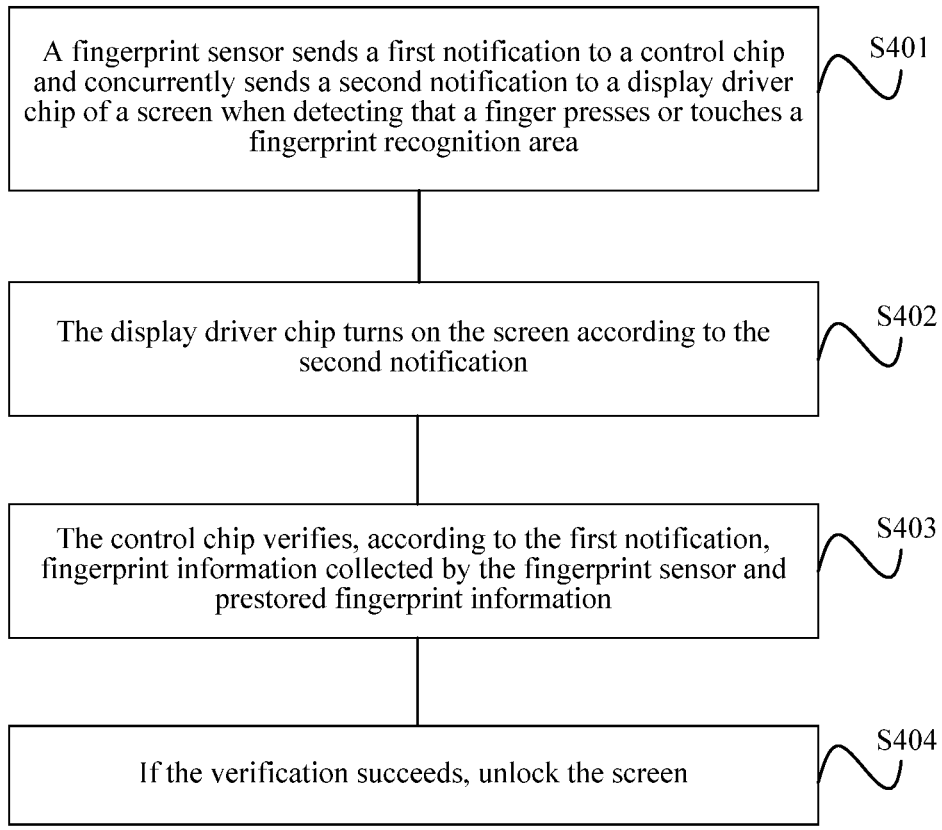
FIG. 4 is a schematic diagram of another method for unlocking a screen by using a fingerprint according to an embodiment of the present disclosure.

FIG. 4 shows another method for unlocking a screen by using a fingerprint according to this embodiment of the present disclosure, and the method includes the following steps.

S401: A fingerprint sensor sends a first notification to a control chip and concurrently sends a second notification to a display driver chip of a screen when detecting that a finger presses or touches a fingerprint recognition area.

S402: The display driver chip turns on the screen according to the second notification.

S403: The control chip verifies, according to the first notification, fingerprint information collected by the fingerprint sensor and pre-stored fingerprint information.

S404: If the verification succeeds, unlock the screen.

Optionally, to intuitively prompt a user and improve user experience, when fingerprint verification of the user fails, the user is prompted by means of vibration, or the user may be prompted on the screen.

Optionally, the control chip is specifically a CPU of a terminal, and the terminal includes the fingerprint sensor. The control chip may also be a main control chip of a fingerprint recognition module.

By means of the method for unlocking a screen by using a fingerprint provided in this embodiment of the present disclosure, a time it takes to unlock a screen by using a fingerprint can be shortened, and fingerprint unlock experience of a user can be improved.

Embodiment 4

Figure 5:
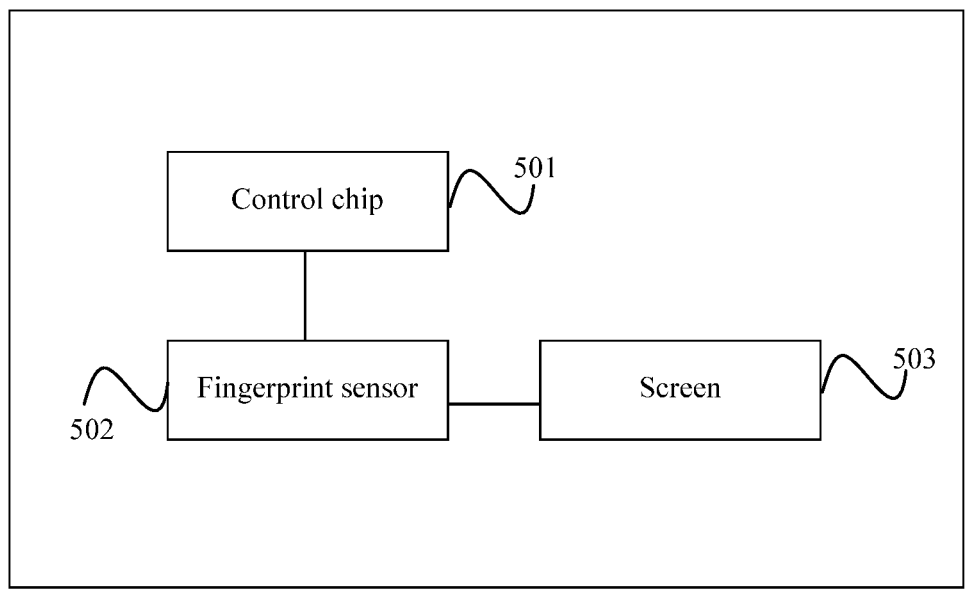
FIG. 5 is a schematic structural diagram of another terminal according to an embodiment of the present disclosure.

FIG. 5 shows another terminal according to this embodiment of the present disclosure, and the terminal includes: a fingerprint sensor 502, a control chip 501, and a screen 503. The fingerprint sensor 502 sends a first notification to the control chip 501 and concurrently sends a second notification to a display driver chip of the screen 503 when detecting that a finger presses or touches a fingerprint recognition area. The display driver chip turns on the screen 503 according to the second notification. The control chip 501 verifies, according to the first notification, fingerprint information collected by the fingerprint sensor 502 and pre-stored fingerprint information. If the verification succeeds, the screen 503 is unlocked.

By means of the another terminal provided in this embodiment of the present disclosure, a time it takes to unlock the screen by using a fingerprint can be shortened, and fingerprint unlock experience of a user can be improved.

This embodiment of the present disclosure further provides a computer readable storage medium storing one or more programs. The one or more programs include instructions. When the instructions are executed by a portable electronic device including a display and multiple application programs, the portable electronic device performs the method according to either of Embodiment 1 and Embodiment 3. The display includes a touch-sensitive surface and a display screen.

By means of the computer readable storage medium provided in this embodiment of the present disclosure, a time it takes to unlock a screen by using a fingerprint can be shortened, and fingerprint unlock experience of a user can be improved.

Finally, it should be noted that the foregoing embodiments are merely examples for describing the technical solutions of the present disclosure other than limiting the present disclosure. Although the present disclosure and benefits of the present disclosure are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present disclosure.

What is claimed is:

1. A mobile terminal comprising:
 a control circuit;
 a display driver circuit coupled to the control circuit;
 a screen coupled to the display driver circuit and comprising a light source; and
 a fingerprint sensor coupled to the control circuit and comprising a fingerprint recognition area, wherein the fingerprint sensor is configured to send a first notification to the control circuit and a second notification to the display driver circuit when the fingerprint recognition area detects a finger press or touch, wherein the control circuit is configured to perform, based on the first notification, fingerprint verification by comparing fingerprint information collected by the fingerprint sensor with pre-stored fingerprint information before the light source is turned on, wherein the screen is configured to:
complete, based on the second notification, preparation work for turning on the screen, wherein the preparation work comprises power-on, resetting, and register initialization for the screen, and wherein the preparation work is completed before the light source is turned on; and
turn on the light source after completion of the preparation work and after the fingerprint verification succeeds, and wherein the preparation work and the fingerprint verification are concurrently performed.

2. The mobile terminal of claim 1, wherein the mobile terminal is configured to prompt, via vibration, a user that the fingerprint verification failed.

3. The mobile terminal of claim 1, wherein the control circuit is a central processing unit (CPU).

4. The mobile terminal of claim 1, wherein the light source is not turned on when the fingerprint verification fails.

5. The mobile terminal of claim 4, wherein the screen is further configured to cancel the preparation work when the fingerprint verification fails.

6. An electronic device comprising:
a screen coupled to a display driver circuit and comprising a light source;
a fingerprint sensor comprising a fingerprint recognition area;
one or more processors coupled to the display driver circuit, the screen, and the fingerprint sensor; and
a memory coupled to the one or more processors, wherein the memory is configured to store one or more programs that, when executed by the one or more processors, cause the electronic device to:
receive an input from the fingerprint recognition area;
in response to the input,
notify the display driver circuit to perform preparation work for turning on the screen, wherein the preparation work comprises power-on, resetting, and register initialization for the screen, and wherein the preparation work is performed before the light source is turned on; and
notify the fingerprint sensor to collect fingerprint information;
perform fingerprint verification before the light source is turned on by comparing the fingerprint information collected by the fingerprint sensor with pre-stored fingerprint information; and
turn on the light source after the preparation work is completed and after the fingerprint verification succeeds, wherein the preparation work and the fingerprint verification are concurrently performed.

7. The electronic device of claim 6, wherein the electronic device is further caused to cancel the preparation work when the fingerprint verification fails.

8. The electronic device of claim 6, wherein the one or more processors comprise a central processing unit (CPU).

9. The electronic device of claim 6, wherein the electronic device is further caused to prompt a user via vibration when the fingerprint verification fails.

10. The electronic device of claim 6, wherein a lock screen application causes the display driver circuit to perform the preparation work for turning on the screen.

11. The electronic device of claim 6, further comprising a light-emitting diode (LED) configured to blink a light in response to failure of the fingerprint verification.

12. The electronic device of claim 6, further comprising a front part, wherein the fingerprint sensor is disposed on the front part and below the screen.

13. The electronic device of claim 6, further comprising:
a back part; and
a rear camera,
wherein the fingerprint sensor is disposed on the back part and below the rear camera.

14. The electronic device of claim 6, further comprising a power key, wherein the fingerprint sensor is integrated with the power key.

15. The electronic device of claim 6, wherein the light source is not turned on when the fingerprint verification fails.

16. A system comprising:
a control circuit; and
a memory coupled to the control circuit, wherein the memory is configured to store one or more programs that, when executed by the control circuit, cause the system to:
receive a first notification from a fingerprint sensor of an electronic device;
in response to the first notification,
notify a display driver circuit of a screen of the electronic device to perform preparation work for turning on the screen, wherein the preparation work comprises power-on of the display driver circuit, resetting, and register initialization; and
notify the fingerprint sensor to collect fingerprint information; and
turn on the screen after the preparation work is completed and after a fingerprint verification succeeds, wherein the fingerprint verification is performed before the screen is turned on by comparing the fingerprint information collected by the fingerprint sensor with pre-stored fingerprint information, and the preparation work and the fingerprint verification are concurrently performed.

17. The system of claim 16, wherein the system is further caused to send, in a case that the fingerprint verification fails, a second instruction to keep the screen locked.

18. The system of claim 16, wherein the system is further caused to cancel the preparation work when the fingerprint verification fails.

19. The system of claim 16, wherein the control circuit is a central processing unit (CPU).

20. The system of claim 16, wherein the fingerprint sensor is integrated with the system and is disposed on a front part of the electronic device and below the screen.

21. The system of claim 16, wherein the fingerprint sensor is coupled to a power key of the electronic device.

* * * * *